C. Hermance.
Gate Hinge.
N° 62,196. Patented Feb. 19, 1867.

Witnesses.
Inventor.

United States Patent Office.

CHARLES HERMANCE, OF SCHUYLERVILLE, NEW YORK.

Letters Patent No. 62,196, dated February 19, 1867.

---

IMPROVEMENT IN GATE HINGES.

---

The Schedule referred to in these Letters Patent and making part of the same.

---

TO ALL WHOM IT MAY CONCERN:

Be it known that I, CHARLES HERMANCE, of Schuylerville, in the county of Saratoga, and State of New York, have invented a new and improved Hinge for Farm Gates; and I do hereby declare that the following is a full, clear, and exact description thereof, reference being had to the accompanying drawings, making a part of this specification, in which—

Similar letters of reference indicate corresponding parts in the several figures.

The object of this invention is to construct a but hinge, with a roller upon one of its leaves, for the purpose of supporting a sliding and swinging gate, and attaching such gate to its post; said hinges being also so constructed as to prevent lateral displacement of the gate from its rolling support, and also to admit of the gate being operated either in an elevated position, out of the way of a snow-bed, or in a depressed position, all as will be hereinafter described.

To enable others skilled in the art to understand my invention, I will describe its construction and operation.

Figure 1:
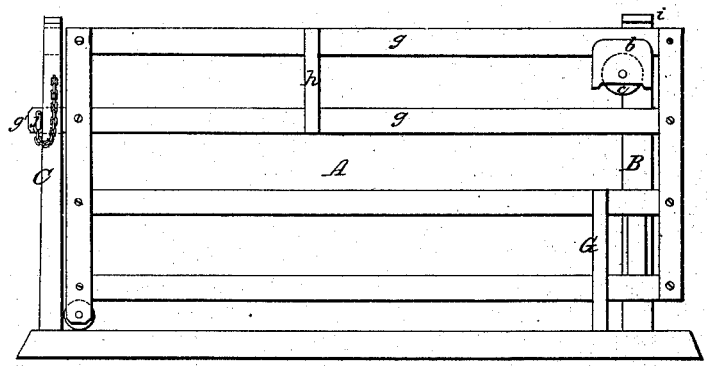
Figure 1 is a side view of a gate having the improved hinge applied to it.
Figure 2:
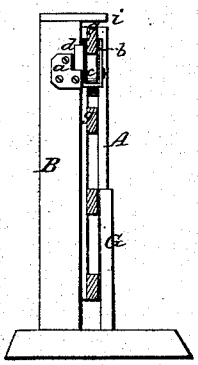
Figure 2 is a vertical cross-section of the gate, looking toward the hinge.
Figure 3:
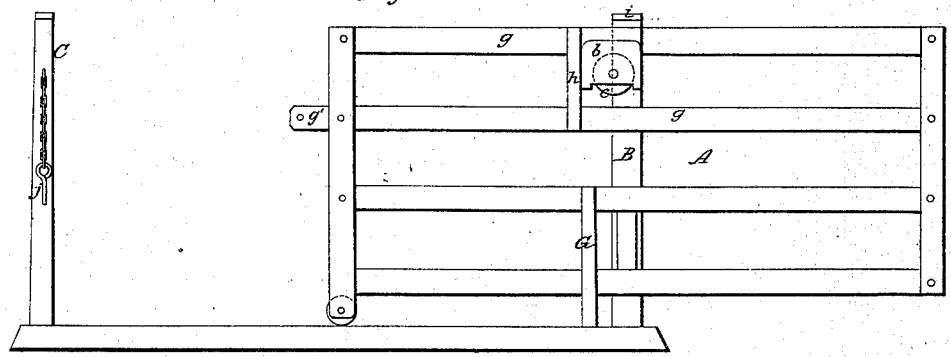
Figure 3 shows the gate partly open.
Figure 4:
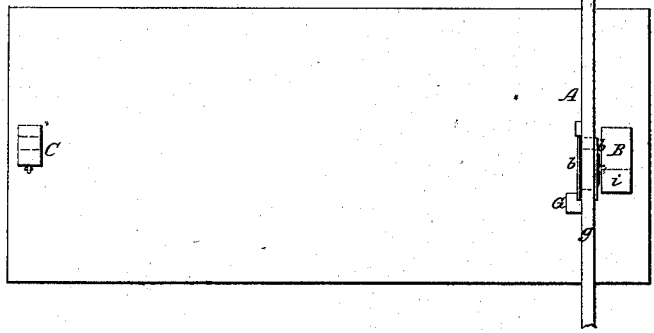
Figure 4 is a plan view, showing the gate entirely open.
Figure 5:
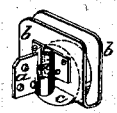
Figure 5 is a perspective view of the improved gate hinge.

In the accompanying drawings I have represented the gate A arranged so that one end will roll upon the ground in opening and closing it with a lateral movement, which arrangement is designed for the summer months, when there is no snow upon the ground. For winter use the gate A is elevated, so that it can be opened and closed without the necessity of clearing away the snow, as will be hereinafter described. The gate, which I have shown in the drawings, is made of horizontel rails or bars united to vertical pieces; but I shall not confine my invention to such a gate, as a picket gate can be used instead. B represents the post to which the gate A is hinged, and C is the post to which the gate is fastened when closed. The gate is hinged to the post B by means of a but hinge, shown clearly in figs. 1, 2, 4, and 5, one leaf $a$ of which is secured firmly to the post B on that side which is opposite the post C. The other leaf of this hinge consists of plates $b\ b$, which are united together at their lower ends, and adapted for receiving between them a roller or wheel, $c$, the axis of which has its bearings in said plates. The pintle on the leaf $a$ receives an eye, $d$, which is formed on or applied to the plates $b\ b$, as shown in fig. 5. The width of the wheel $c$ and the space between the plates $b\ b$ should be slightly greater than the thickness of the rails $g$ of the gate, so that either one of these rails will move freely upon said wheel in a direction with their lengths, the plates $b$ serving as lateral supports for keeping the rail upon its wheel. A little to one side of the middle of the length of the gate A, a vertical batten, $h$, is secured firmly to the two rails $g$, so as to serve as a stop when the gate is moved laterally in a direction with its length, and brought against the hinged plates, as shown in fig. 3. When the gate is in this position it will be balanced upon the wheel $c$, so that it can be swung around at right angles to its original position across the road, as shown in fig. 4. The lower part of the gate is sustained laterally between the post B and an auxiliary post G, which latter is located in such position as to prevent the gate from tilting, in whatever position it may be placed. The gate is held down in place upon the wheel $c$ by means of a cap, $i$, which is secured to the upper end of the post B. When the gate is fully opened, as shown in fig. 4, the cap $i$ no longer holds it down, and, if desirable, it may be lifted out of its place upon wheel $c$. The post C has two holes through it, for receiving the projecting end $g'$ of the lower rail $g$. The lower hole through said post receives the end $g'$, when the gate is arranged as shown in figs. 1, 2, and 3, and the upper hole receives the end $g'$ when the gate is elevated and the lower rail $g$ mounted upon the wheel $c$. The pin $j$, which is attached to the post C by a chain, is inserted through the projection $g'$ for fastening the gate, as shown in fig. 1.

To allow persons passage through the gate it is only necessary to move it in a direction with its length, as indicated in fig. 3, but for the passage of wagons the gate is moved to the position shown in fig. 3, and then swung around at right angles, as shown in fig. 4. For relieving the gate from snow during the winter it is elevated, so as to have the second rail $g$ roll upon the wheel $c$.

I am aware that laterally sliding and swinging gates have been mounted upon wheels, which had their bearings upon vertical swivelling pins; said swivelling bearings being flanged, so as to keep the gate in place. But such contrivances are objectionable. By my invention I obtain all the advantages of a gate hinge, combined with a rolling support for the gate.

What I claim as new, and desire to secure by Letters Patent, is—

1. The construction of a gate hinge of a leaf, $a$, and plates $b\ b$, the latter having a wheel, $c$, between them, and an eye on one side, for receiving the pintle on the leaf $a$, substantially as described.

2. In gates which are allowed to move in a direction with their lengths, and also to swing about an axis, I claim providing for elevating or depressing such gates, at pleasure, so as to adapt them for both summer and winter use, substantially as herein described.

Witness my hand in matter of my application for a patent for an improved gate hinge.

CHAS. HERMANCE.

Witnesses:
JEREMIAH HERMANCE,
MARTIN MILLET.